(12) United States Patent
Laing et al.

(10) Patent No.: US 8,714,934 B2
(45) Date of Patent: May 6, 2014

(54) CIRCULATION PUMP, HEATING SYSTEM AND METHOD OF DETERMINING THE FLOW RATE OF A LIQUID THROUGH A PIPE

(75) Inventors: Oliver Laing, Stuttgart (DE); Karsten Laing, Althuette (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1231 days.

(21) Appl. No.: 12/290,688

(22) Filed: Oct. 30, 2008

(65) Prior Publication Data

US 2009/0121034 A1    May 14, 2009

(30) Foreign Application Priority Data

Nov. 5, 2007    (DE) .......................... 10 2007 054 313

(51) Int. Cl.
*F04D 27/00*    (2006.01)

(52) U.S. Cl.
USPC .......................................... 417/20; 417/44.11

(58) Field of Classification Search
USPC ............... 417/20, 44.11, 423.1; 318/254, 473
See application file for complete search history.

(56) References Cited

U.S. PATENT DOCUMENTS

| | | | |
|---|---|---|---|
| 4,992,688 A | 2/1991 | Cap et al. | |
| 5,592,058 A * | 1/1997 | Archer et al. | 318/400.09 |
| 5,920,134 A | 7/1999 | Mayer et al. | |
| 5,997,261 A | 12/1999 | Kershaw et al. | |
| 6,097,129 A | 8/2000 | Furtwängler et al. | |
| 6,354,805 B1 * | 3/2002 | Møller | 417/44.11 |
| 2004/0028539 A1 | 2/2004 | Williams et al. | |
| 2004/0119371 A1 * | 6/2004 | Laing | 310/254 |
| 2004/0160142 A1 | 8/2004 | Marioni | |
| 2005/0141888 A1 | 6/2005 | Laing | |
| 2005/0141889 A1 * | 6/2005 | Laing | 392/322 |
| 2006/0071569 A1 | 4/2006 | Stewart et al. | |

FOREIGN PATENT DOCUMENTS

| | | |
|---|---|---|
| DE | 33 42 967 | 6/1985 |
| DE | 87 12 486 | 2/1988 |
| DE | 88 11 420 | 1/1989 |
| DE | 43 26 391 | 2/1995 |
| DE | 44 35 511 | 2/1996 |
| DE | 196 46 617 | 5/1998 |
| DE | 102 36 700 | 2/2004 |
| DE | 103 04 398 | 8/2004 |
| DE | 103 22 366 | 8/2004 |
| EP | 0 456 169 | 11/1991 |
| EP | 0 913 910 | 5/1999 |
| EP | 0 945 967 | 9/1999 |
| EP | 1 026 507 | 8/2000 |

(Continued)

*Primary Examiner* — Charles Freay
*Assistant Examiner* — Philip Stimpert
(74) *Attorney, Agent, or Firm* — Lipsitz & McAllister, LLC

(57) ABSTRACT

A circulation pump for a conveyed liquid is provided. The circulation pump has an electric motor, which is electronically commutated, has a rotor, a stator and a motor circuit. An impeller is connected in a rotationally fixed manner to the rotor. The electric motor has an evaluation device for determining a flow rate of conveyed liquid through the circulation pump from a rotational speed of the rotor and/or a power consumption of the electric motor. At least one signal output is provided, by which a flow rate signal and/or flow rate-dependent switching signal can be supplied by the circulation pump.

25 Claims, 13 Drawing Sheets

(56) References Cited

FOREIGN PATENT DOCUMENTS

| | | |
|---|---|---|
| EP | 1 361 368 | 11/2003 |
| EP | 1 416 607 | 5/2004 |
| EP | 1 437 819 | 7/2004 |
| JP | 11 234948 | 8/1999 |
| WO | 2004/042891 | 5/2004 |

\* cited by examiner

CIRCULATION PUMP, HEATING SYSTEM AND METHOD OF DETERMINING THE FLOW RATE OF A LIQUID THROUGH A PIPE

The present disclosure relates to the subject matter disclosed in German application number 10 2007 054 313.3 of Nov. 5, 2007, which is incorporated herein by reference in its entirety and for all purposes.

BACKGROUND OF THE INVENTION

The invention relates to a circulation pump for a conveyed liquid, comprising an electric motor, which is electronically commutated and has a rotor, a stator and a motor circuit, and an impeller that is connected in a rotationally fixed manner to the rotor.

The invention further relates to a heating system for heating a liquid in a basin, comprising a flow-through region for liquid that is positioned outside a liquid-receiving space of the basin, a heater that is disposed at the flow-through region, a control device for the heater as well as a circulation pump.

The invention further relates to a method of determining the flow rate of a liquid through a pipe.

From DE 103 22 366 A1 a heating device for a liquid in a basin is known, which comprises a flow-through section that can be positioned outside a liquid receiving space of the basin. Disposed in the flow-through section is a heater, past which the liquid flows for heating purposes. If the flow rate of the liquid through the flow-through section is no longer adequate, then the heater has to be switched off.

From the background art it is known to use a pressure-operated switch to measure a banking-up pressure in the pipe and respond to variations of the banking-up pressure. It is further known to use a paddle switch with a reed relay to obtain a measure of the flow rate.

SUMMARY OF THE INVENTION

In accordance with the present invention, a circulation pump with advantageous properties is provided.

In accordance with an embodiment of the invention, the electric motor has an evaluation device, by means of which a flow rate of conveyed liquid through the circulation pump can be determined from a rotational speed of the rotor and/or a power consumption of the electric motor, and at least one signal output is provided, at which a flow rate signal and/or a flow rate-dependent switching signal can be supplied by means of the circulation pump.

In an electronically commutated circulation pump (a circulation pump with an electronically commutated electric motor), the electric power consumption is correlated with the hydraulic power. From this correlation the flow-through quantity (flow rate) may be determined. The circulation pump may therefore supply a flow rate signal and/or a switching signal. For an application it is then no longer necessary to provide an additional sensor or switch and the result is a correspondingly simpler construction that is less susceptible to faults.

The flow rate signal in this case may directly characterize the flow rate. Such a signal is then further processed for example by a control device for a heater in order then to control the heater on the basis of this flow rate signal.

It is also possible that in the evaluation device there is already generation of a switching signal that may be used without further processing for control of a heater. The evaluation device then supplies a flow rate-dependent switching signal. For this switching signal the hysteresis can be predetermined, i.e. it can be defined at which determined flow rate a heater is to be switched on and at which flow rate a heater is to be switched off, wherein the switch-on point and switch-off point may vary in dependence upon the direction of variation (increase or decrease) of the flow rate. Thus, for example in the vicinity of a limit throughflow frequent switching (switching on and off of the heater) can be prevented. As a result, an electronic control device of the heater with relay is spared and the heater itself is also spared, thereby extending the service life of a corresponding installation.

Pressure switches or paddle switches known from the background art have no hysteresis. As a result, frequent switching may occur at a limit range. Such systems are very susceptible to faults.

The evaluation device is easy to integrate into the circulation pump. In particular, this may be realized by software development at the motor circuit.

The rotational speed of the rotor and/or the power consumption of the electric motor are known as such and/or easy to determine. In an electronically commutated electric motor, the position of the rotor has to be determined by means of a position measuring device. As a result, the rotational speed is also known. The power consumption of the electric motor may easily be determined from the control data thereof.

It is quite particularly advantageous if the evaluation device is at least partially integrated into the motor circuit. This makes it easy to realize a supplementary function for the circulation pump, wherein the constructional outlay for providing this supplementary function is minimized.

It is advantageous if the evaluation device comprises at least one processor, which is a processor of the motor circuit. In this way, the constructional outlay for providing the supplementary function is minimized.

It is quite particularly advantageous if the evaluation device comprises a storage device. In this storage device it is possible in particular to effect non-volatile storage of characteristics or families of characteristics and/or a mathematical algorithm of the dependence of the flow rate upon the rotational speed and/or the motor power.

In particular, a characteristic or a family of characteristics and/or algorithm regarding the dependence of the flow rate upon the rotational speed of the rotor given a constant motor power and/or the dependence of the flow rate upon the motor power given a constant rotational speed of the motor are stored in the storage device. The characteristics and/or families of characteristics have preferably been previously determined by measurements and stored. During operation of the circulation pump it is then possible to determine the flow rate Q from the known characteristics and/or families of characteristics. It is also possible, particularly in the case of an unregulated pump that is being operated at a constant rotational speed/with constant power consumption, to determine the correlation between rotational speed of the rotor and/or consumed motor power and flow rate from a mathematical correlation. For example, a linear correlation is assumed. The stored algorithm characterizes the mathematical correlation.

In this case, it is in particular provided that the electric motor has an operating mode with regulation to a constant motor power. In particular, in this case the constant motor power is adjustable in order to enable an adaptation to an application.

Alternatively or additionally it is possible for the electric motor to have an operating mode with regulation to a constant rotational speed. For adaptation to applications this constant rotational speed is in particular adjustable.

In one embodiment, the circulation pump by means of the evaluation device has an operating mode, in which the evaluation device supplies a flow rate-dependent switching signal with an adjusted or adjustable hysteresis. The switching signal may be used directly without further processing for example to operate a heater, i.e. switch a heater on and off. The effect achievable by defining the hysteresis is that switching-on is effected at a specific flow rate (or within a specific range of the flow rate) and similarly switching-off is effected "direction-dependently" at a specific flow rate or in a specific flow rate range. By defining the hysteresis, i.e. by programming the hysteresis in the evaluation device, it is possible to prevent frequent switching of a heater in a limit range; in particular, it is therefore possible to avoid "fluttering" of the circuit of a heater in the vicinity of a limit flow. Thus, the electronic control device is spared and the heater itself is spared. The adjustment of the hysteresis is effected for example during manufacture of the circulation pump by fixed setting at the evaluation device.

It is advantageous if the motor circuit is disposed in a second chamber of a housing, which second chamber is separate from a first chamber of the housing, in which first chamber the stator and the rotor are disposed. In this way, a separation of a part of the circulation pump, into which liquid is admitted, and a sealed region of the circulation pump is achieved. The electronic components of the motor circuit and of the evaluation device are therefore also easy to cool.

For example, the second chamber is air-cooled.

In particular, the evaluation device is then also disposed in the second chamber.

It is advantageous if the rotor is of a spherical design facing the stator. A corresponding electric motor may be operated with high efficiency. It is also advantageous if the rotor is spherically mounted. With spherical mounting it is possible to minimize the bearing clearance. Noise generation is moreover minimized.

It is further advantageous if there is associated with the stator an interface, which faces the rotor and is of a spherical design. The corresponding electric motor may be operated with high efficiency.

Advantageously, the rotor by means of one or more permanent magnets is a magnetic field-generating rotor. In this way it is possible to provide a highly efficient electric motor.

If coils of the stator are disposed below the rotor, it is possible to design the electric motor with compact transverse dimensions.

It may be provided that there is associated with the stator at least one temperature sensor that is used to measure the temperature at at least one coil (winding) of the stator. In principle, the winding resistances are temperature-dependent. This temperature dependence fundamentally influences the dependence of the rotational speed and/or of the motor power upon the flow rate. By taking into account the actual resistance of the windings (while simultaneously taking into account the measured temperature) the accuracy may be increased; in particular, the optimized characteristic may be selected.

It is then advantageous if the at least one temperature sensor is connected in a signal-effective manner to the evaluation device. The evaluation device may therefore take the temperature-dependent resistance of the windings into account when determining the flow rate Q.

The evaluation device preferably comprises a program unit that takes the resistance of stator coils into account when determining the flow rates. In this way, an increased accuracy is obtained when determining the flow rate.

It may further be provided that the evaluation device comprises a program unit that takes a bearing friction during rotation of the rotor into account when determining the flow rate. This likewise increases the accuracy. For example, a "calibrating" rotational speed variation may be realized by means of the program unit; the electric power consumption correlates with the cube of the rotational speed, while the bearing friction is in linear relationship with the rotational speed of the rotor. By means of a power variation it is possible to separate the two components (the electric power consumption component and the bearing friction component). This in turn allows the bearing friction component to be at least approximately determined and then taken into account during the evaluation.

In accordance with the invention, a heating system is provided, which is of a simple construction and which is reliably operable.

In accordance with an embodiment of the invention, a circulation pump according to the invention is provided for conveying the liquid through the flow-through region, wherein at least one signal output of the circulation pump is connected in a signal-effective manner to the control device for the heater.

The circulation pump then supplies a flow rate signal and/or flow rate-dependent switching signal to the control device, which is a higher-level control device for the heater. If too low a flow rate is detected, which may be caused for example by an obstruction, the control device may then switch off the heater.

If too high a flow rate is detected and lies in particular above a defined threshold value, then the heater may likewise be shut down and optionally the circulation pump may also be switched off. A high flow rate may be attributable for example to a pipe leakage.

In accordance with the invention, a method that may be realized with a low outlay is provided.

In accordance with an embodiment of the invention, the liquid is conveyed by means of a circulation pump, which has an electronically commutated electric motor, and in which by means of an evaluation device, which is integrated into the circulation pump, the flow rate is determined from the rotational speed of a rotor of the electric motor and/or from the motor power, and a flow rate signal and/or flow rate-dependent switching signal is supplied by means of the circulation pump.

The method according to the invention has the advantages already explained in connection with the circulation pump according to the invention.

Further advantageous embodiments of the method according to the invention have likewise already been explained in connection with the circulation pump according to the invention.

In particular, the evaluation device determines the flow rate from a stored characteristic or a stored family of characteristics and/or from a mathematical relationship. The characteristic and/or the family of characteristics in this case may be characteristics of the dependence of the rotational speed and the flow rate given a constant motor power or the dependence of the motor power upon the flow rate given a constant rotational speed. The mathematical relationship is stored in the evaluation device. For example, a linear relationship is formulated.

For example, the circulation pump during operation is regulated to a constant motor power or to a constant rotor rotational speed. The circulation pump may also be operated in an unregulated manner.

It is advantageous if the flow rate signal and/or flow rate switching signal is supplied to a control device of a heater, which is disposed at the pipe. This makes it easy to carry out flow rate monitoring, wherein no additional sensor or switch need be provided. The corresponding installation outlay is therefore reduced. What is more, the operational reliability of the corresponding installation is increased because the number of components is minimized.

It may be provided that the circulation pump supplies a flow rate-dependent switching signal with a defined hysteresis. The hysteresis defines at which flow rate the switching signal is "on" and at which flow rate the switching signal is "off" in dependence upon whether the flow rate has increased or has decreased. Such a switching signal may be used directly without further processing for control of a heater. By defining a corresponding hysteresis it is possible, particularly in a range of a limit flow, to prevent frequent switching of the heater, i.e. prevent a "fluttering" of the heater with regard to switching on and off. It is therefore possible to extend the service life of the corresponding system.

The following description of preferred embodiments serves in connection with the drawings to provide a detailed explanation of the invention.

DETAILED DESCRIPTION OF THE INVENTION

Figure 1:
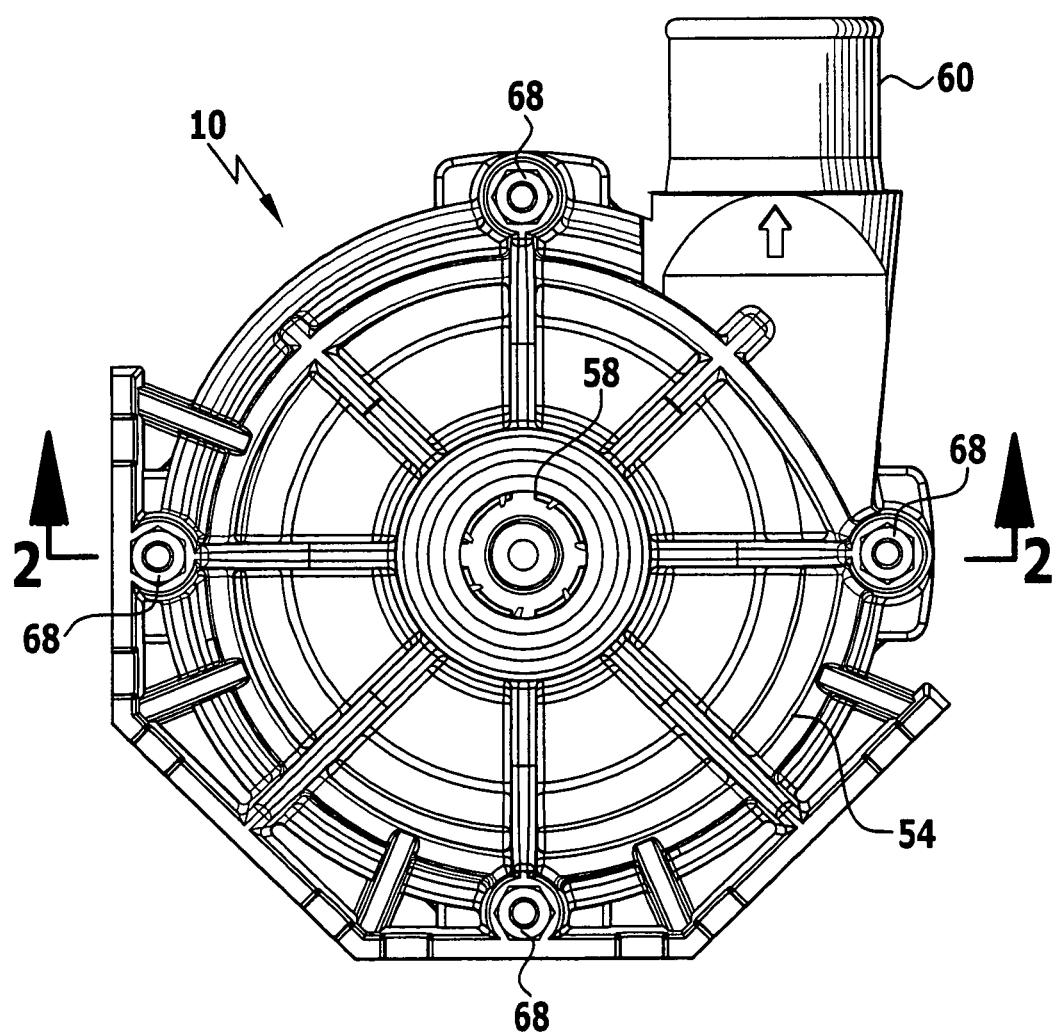
FIG. 1 shows a plan view of an embodiment of a circulation pump in accordance with the invention.
Figure 2:
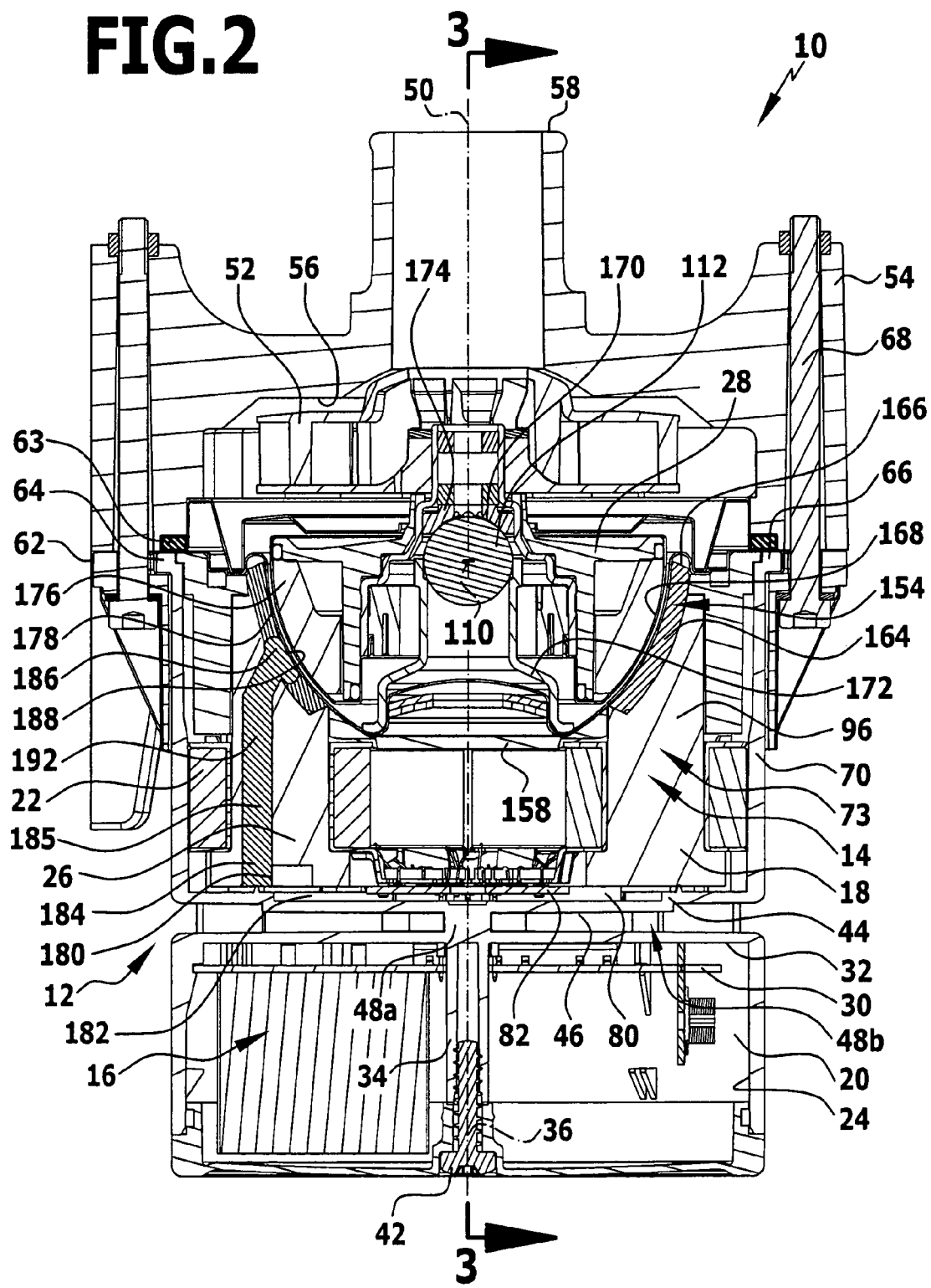
FIG. 2 shows a sectional view along the line 2-2 according to FIG. 1.
Figure 3:
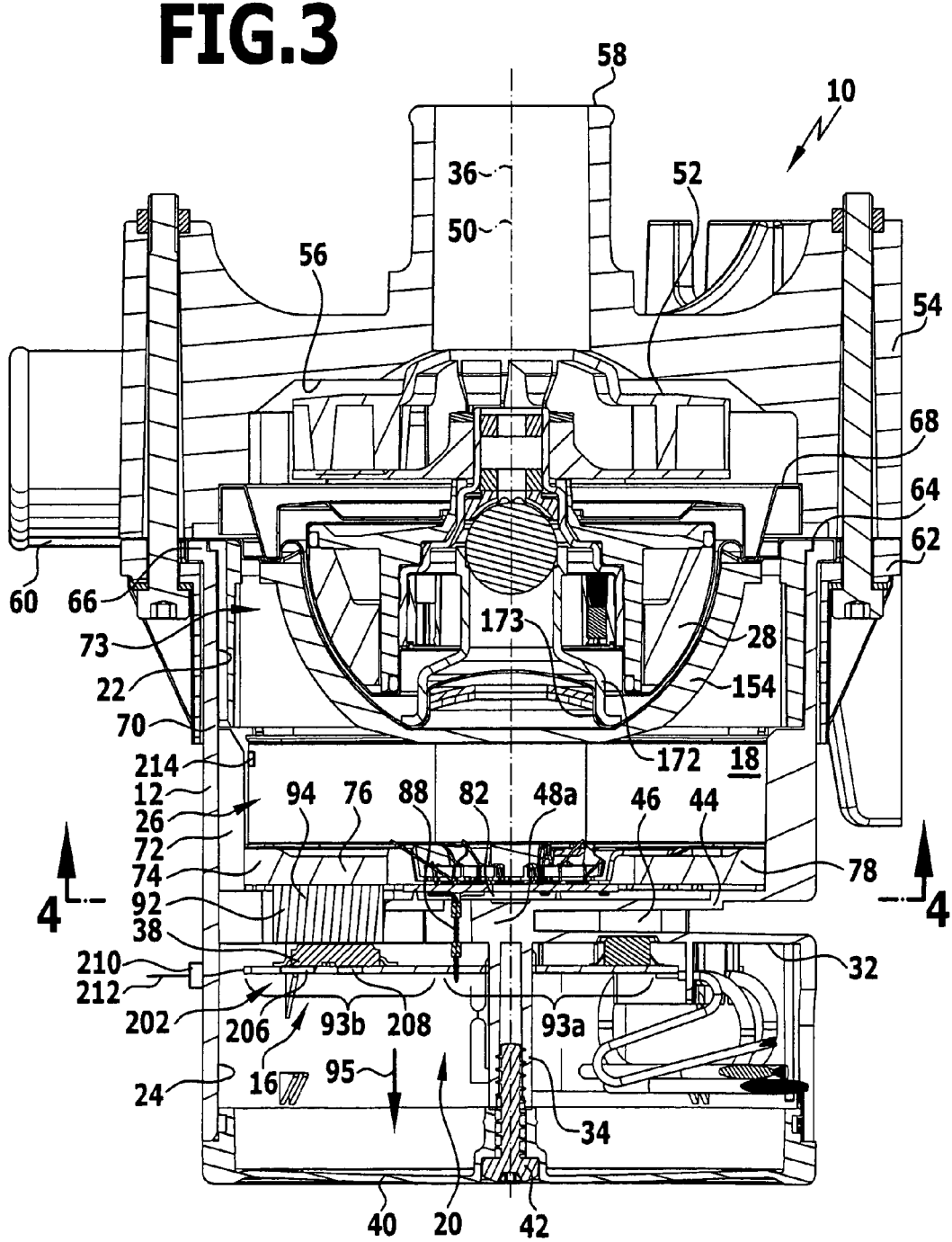
FIG. 3 shows a sectional view along the line 3-3 according to FIG. 2.

An embodiment of a circulation pump in accordance with the invention, which is shown in FIGS. 1 to 3 and denoted there by 10, comprises a housing 12. Disposed in the housing 12 is an electric motor 14 with an electric motor circuit 16.

The housing 12 has a first chamber 18 and a second chamber 20 separate from the first chamber 18. The first chamber 18 has a substantially cylindrical interior 22. The second chamber 20 likewise has a substantially cylindrical interior 24.

In the first chamber 18 a stator 26 and a rotor 28 of the electric motor 14 are disposed. The first chamber 18 in this case has a first sub-chamber that is exposed to the conveyed liquid. In a second sub-chamber of the first chamber 18 the stator is seated, wherein the second sub-chamber is separated in a liquid-proof manner from the first sub-chamber. The rotor 28 is seated in the first sub-chamber.

Disposed in the second chamber 20 is a carrier 30, which in particular is a carrier printed circuit board, on which the motor circuit 16 or at least main components of the motor circuit 16 are seated. The second chamber 20 serves as a "switchgear cubicle" for the electric motor 14.

In the direction of the first chamber 18 the second chamber 20 has an end wall 32. Seated on the end wall 32 and pointing into the interior 24 is a pin element 34. This pin element 34 is in particular disposed coaxially with a centre line 36 of the housing 12. Preferably, the first chamber 18 and the second chamber 20 have a centre line that coincides with the centre line 36.

Disposed on the carrier 30 are electric circuit elements and connection lines for example in the form of printed conductors. These are in particular discrete circuit elements and integrated circuit elements. The motor circuit 16 comprises one or more electronic power circuit elements 38, such as for example one or more thyristors, which are disposed on the carrier 30.

The second chamber 20 is closed in an outward direction by a cover element 40 that is fastened for example by means of a screw 42 to the pin element 34.

The first chamber 18 has in the direction of the second chamber 20 an end wall 44. This end wall 44 is spaced apart from the end wall 32 of the second chamber 20. Formed between the end wall 44 and the end wall 32 is an interspace 46 that is open towards the exterior and comprises an air gap. Disposed between an outer side of the end wall 32 and an outer side of the end wall 44 in this case are web elements 48a, 48b etc., which hold the end wall 44 and the end wall 32 apart, simultaneously forming the interspace 46.

The housing 12 is preferably of an integral construction. In particular, the end walls 32 and 44 are constructed integrally with corresponding chamber walls.

The second chamber 20 with the motor circuit 16 is air-cooled. By means of the interspace 46 the second chamber 20 is thermally isolated from the first chamber 18, wherein air may flow through the interspace 46 and/or an air cushion lies in the interspace 46.

The rotor 28 is rotatable about an axis of rotation 50 that coincides with the centre line 36. Connected in a rotationally fixed manner to the rotor 28 is an impeller 52 for conveying a liquid.

Disposed on the housing 12 is a top cover element 54, which has a recess 56, in which the impeller 52 is rotatable. The top cover element 54 comprises a first connecting piece 58 that is aligned for example coaxially with the centre line 36. Through this first connecting piece 58 conveyed liquid is introducible into the interior 24. By means of the first connecting piece 58 a suction side of the circulation pump 10 is defined.

There is further disposed on the top cover element 54 a second connecting piece 60 (FIGS. 1 and 3), which is oriented for example transversely and in particular at right angles to the centre line 36. Through this second connecting piece 60 conveyed liquid is dischargeable. The second connecting piece 60 defines a discharge end of the circulation pump 10.

The top cover element 54 is fastened to the housing 12 for example by means of a flange 62. For this purpose, the housing 12 at its upper end 64 remote from the second chamber 20 has an outwardly projecting annular region 66. The flange 62 lies from below against the annular region 66. By means of bracing elements 68, such as for example screws or bolts, the top cover element 54 is braced with the flange 62, which in particular takes the form of an annular flange, and is therefore held against the housing 12, wherein a fluid-proof fastening is established by means of an O-ring 63.

Figure 4:
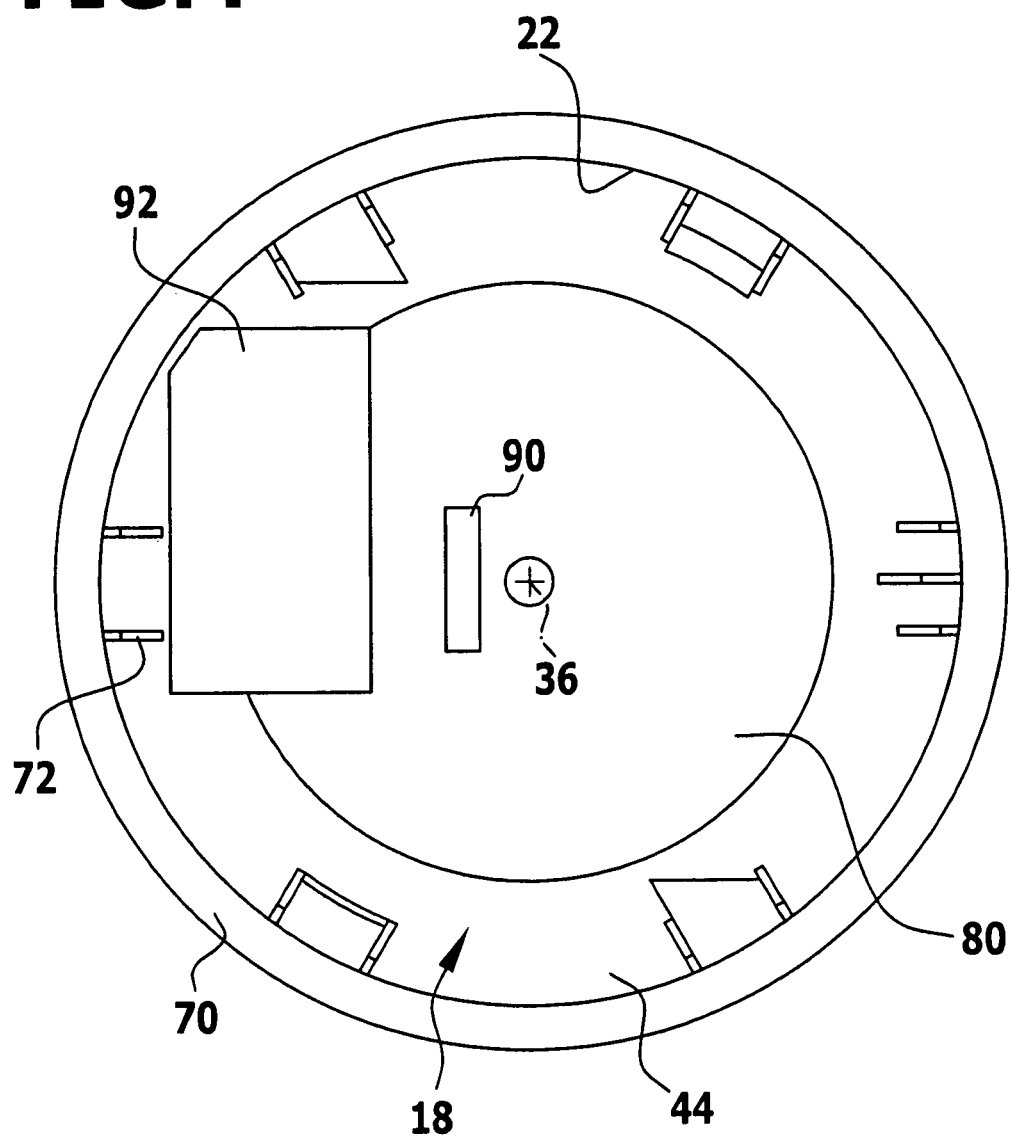
FIG. 4 shows a sectional view along the line 4-4 according to FIG. 3.
Figure 5:
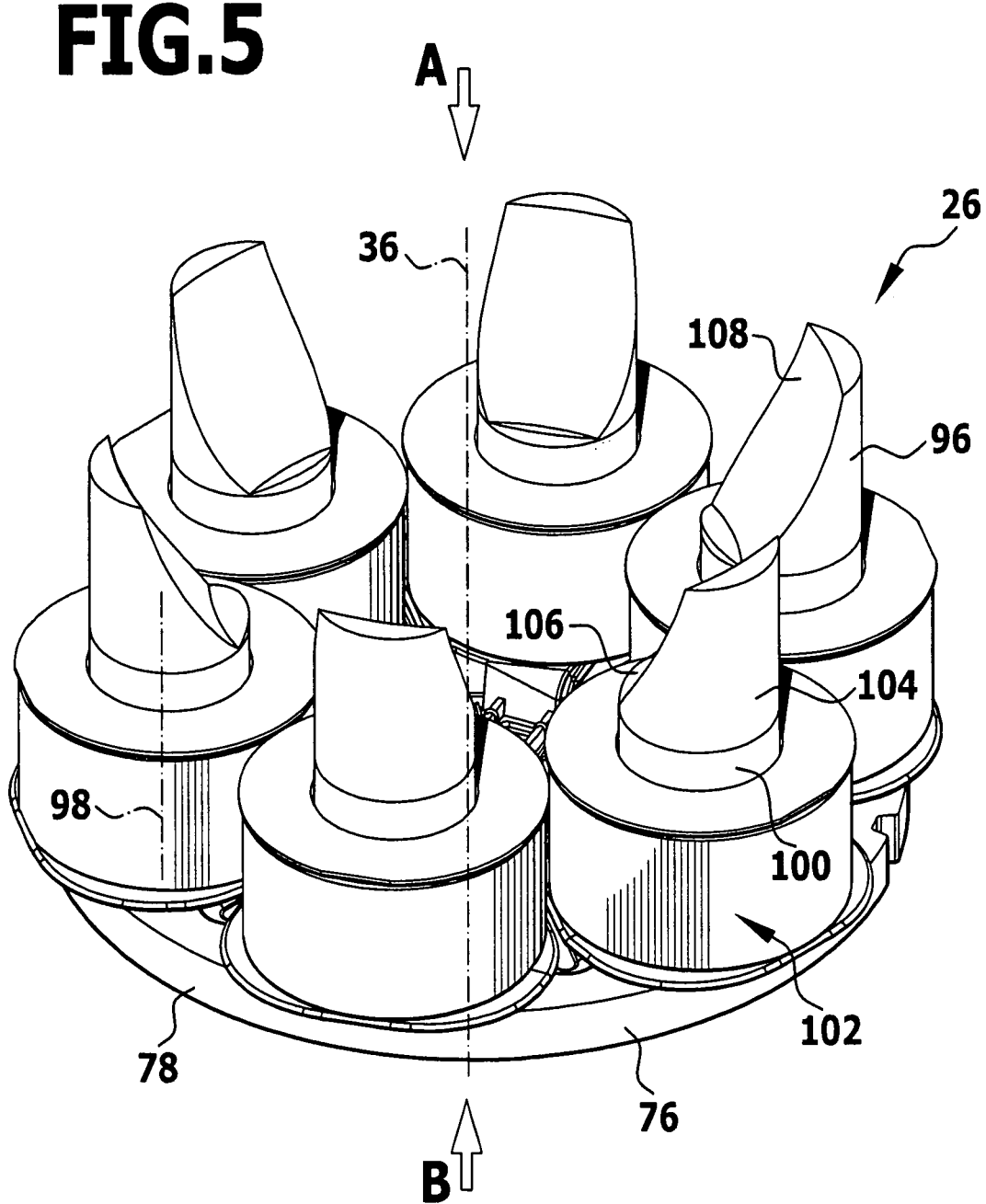
FIG. 5 shows a perspective partial representation of an embodiment of a stator in accordance with the invention.

Positioning elements 72 are disposed on a chamber wall 70 and directed into the interior 22 of the first chamber 18 (FIGS. 3, 4). These positioning elements 72 are designed for example as ribs. For example, as shown in FIG. 4, a plurality of rib pairs are arranged on the chamber wall 70 so as to be distributed around the centre line 36. These positioning elements 72 are used to position the stator 26 during manufacture of the circulation pump 10.

The stator 26 comprises a magnetic return device 73 comprising a magnetic return body 74 and pole shoes. This magnetic return body 74 is in particular of an integral construction. It is manufactured preferably from a compressed powder material, which comprises for example iron grains that are electrically isolated from one another. Such a powder material is known by the name of "SOMALOY" from the Swedish company, Höganäs. In this way it is possible to keep eddy-currents in the magnetic return body 74 low. The requisite magnetic properties (high permeability) are present with an optimized geometric configurability of the magnetic return body 74.

The magnetic return body 74 comprises a holding base 76, which in particular takes the form of a ring 78. By means of this holding base 76 the stator 26 is positioned against an inner side of the end wall 44.

The end wall 44 has a, for example circular, recess 80 (indentation) directed towards the interior 22 (FIG. 4). Disposed in this recess 80 is a contact printed circuit board 82. This contact printed circuit board 82 has contact points 84a, 84b etc. (FIG. 6), at which in each case a coil 86 of the stator 26 is electrically connected, in particular by welding or soldering, to the contact printed circuit board 82.

The contact printed circuit board 82 with its contact points 84a, 84b etc. is in turn connected by one or more electric connection lines 88 (FIG. 3) to the motor circuit 16. For this purpose, in the end wall 32 and the end wall 44 a through-opening 90 is disposed (FIG. 4), through which the connection line 88 extends from the first chamber 18 into the second chamber 20. The opening 90 is closed in the direction of the interspace 46 by means of an outer wall.

Between the first chamber 18 and the second chamber 20 a connection opening 92 is further provided (FIG. 4). This connection opening 92 is closed in the direction of the interspace 46 by means of a surrounding wall 94 (FIG. 3).

Disposed on the carrier 30, which is in turn fastened in the second chamber 20, are electric circuit elements that are positioned in the second chamber 20 and are air-cooled. Further disposed on the carrier 30 are electronic power circuit elements 38, which are at least partially positioned in the first chamber 18. They project through the connection opening 92 into the first chamber 18 and are in thermal contact with the stator 26 and in particular with the magnetic return body 74.

The stator 26 may be cooled effectively by the conveyed liquid that is conveyed by the circulation pump 10. For example, the stator 26 reaches a temperature of ca. 130° C. Water conveyed by means of the circulation pump 10 reaches a maximum temperature of ca. 95° C. to 110° C. The part of the motor circuit 16 that generates a great deal of heat (in particular electronic power circuit elements 38) is in thermal contact with the stator 26 via the connection opening 92 in order to utilize the cooling effect of the conveyed liquid at the stator 26.

The first chamber 18 and the second chamber 20 are in this case separated by the interspace 26 by means of an air gap.

The carrier 30 is split into a low-temperature region 93a and a high-temperature region 93b, wherein the low-temperature region 93a is air-cooled and the circuit elements of the high-temperature region 93b are cooled by means of the conveyed liquid. Circuit elements of the high-temperature region 93b are in thermal contact with the stator 26 and project away from the carrier 30 in the direction of the first chamber 18. Circuit elements of the low-temperature region 93a project away from the carrier 30 in the opposite direction 95, i.e. away from the first chamber 18 in the direction of the cover element 42, in order to ensure an effective thermal decoupling. The low-temperature region 92a is disposed directly below the air gap of the interspace 46.

The contact printed circuit board 82 is seated below the magnetic return body 74 in the recess 80.

The holding base 76 is aligned coaxially with the centre line 36. On the holding base 76 a plurality of locating pins 96 are seated uniformly distributed around the centre line 36 (FIGS. 5 to 8). The locating pins 96 (locating teeth) are all equidistant from the centre line 36. What is more, adjacent locating pins 96 are uniformly spaced apart from one another. Piercing points of axes 98 of the locating pins 96 on the holding base 76 define a regular polygon. In the embodiment shown in FIG. 5 the stator 26 comprises six coils 86. The regular polygon in this example is a hexagon, wherein the angular distance between adjacent locating pins 96 is 60°. The axes 98 of the locating pins 96 are oriented in each case parallel to the centre line 36.

The locating pins 96 are integrally connected to the holding base 76.

Figure 9:
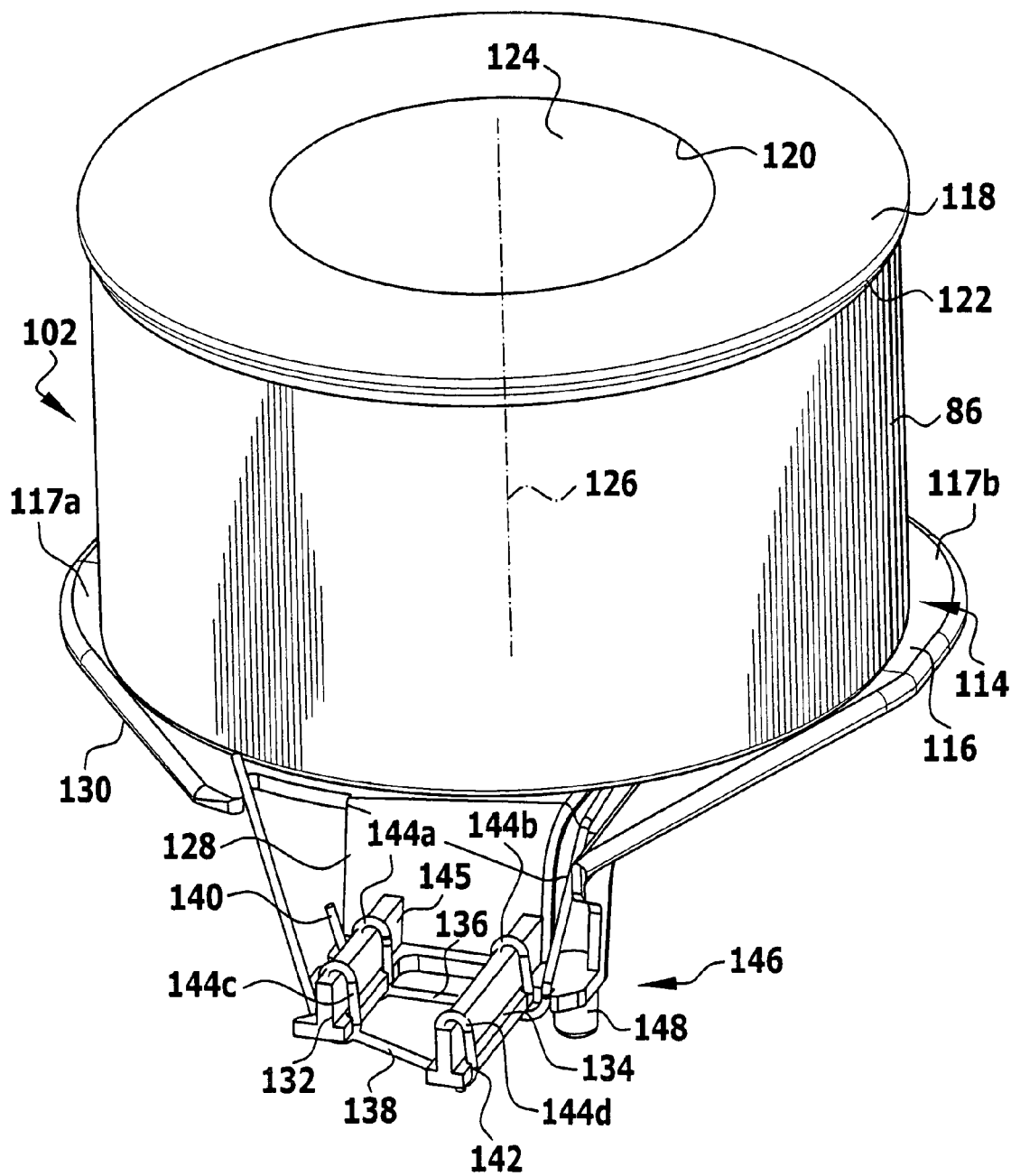
FIG. 9 shows a perspective representation of an embodiment of a coil module in accordance with the invention.

A locating pin 96 comprises a first region 100, on which a coil module 102 (FIG. 9) is disposed. The first region 100 is of a substantially cylindrical construction. By this first region 100 a locating pin 96 is connected to the holding base 76.

A locating pin 96 further comprises a second region 104 that lies above the first region 100 and above the respective coil module 102. The second region 104 comprises in each case a bottom surface region 106, which is of a substantially planar construction and which is parallel to the holding base 76. This bottom surface region 106 has a surface normal that is parallel to the centre line 36.

The second region 104 further comprises a spherical surface region 108, wherein the envelope of the spherical surface regions 108 of all of the locating pins 96 is a spherical surface segment. A centre of the sphere belonging to this spherical surface segment lies on the centre line 36. This centre, which is indicated in FIG. 2 by the reference character 110, lies in particular at the centre of a convex bearing body 112, by means of which the rotor 28 is spherically supported.

Seated on the respective locating pins 96 are coil modules 102, which are fundamentally of an identical construction.

A coil module 102 comprises a coil holder 114. The coil holder 114 in turn comprises a base element 116 and a top element 118. Disposed between the base element 116 and the top element 118 is an in particular hollow-cylindrical winding core 120. Onto this winding core 120 the respective coil 86 is wound by a plurality of windings 122. The top element 118 and the base element 116 are in this case so designed that they project beyond an outer boundary envelope of the coil 86 and hence cover the coil in an upward direction and in a downward direction.

The base element 116 (as well as the top element 118) is so designed that the requisite spacing from adjacent coils and from earthed parts is established by means of the corresponding air gap. For example, for this purpose the base element 116 comprises lateral lugs 117a, 117b, by means of which the base element 116 differs from a circular disk shape.

For example, a minimum spacing (air gap) of 3 mm from metal to metal is realized.

The coil holder 114 has an in particular cylindrical recess 124, which takes the form of a through-opening. The recess 124 forms a pin receiver for a locating pin 96, which may engage through the recess 124. By means of the recess 124 the coil module 102 is mountable onto the associated locating pin 96 in order to fasten the coil 86 to the stator 26.

The coil holder 114 is designed in the style of a cotton reel.

The coil holder 114 is in particular so designed that the coil 86 may be produced on the coil holder 114 automatically by means of a winding machine.

A coil axis 126 is oriented transversely and in particular at right angles to the base element 116 and to the top element 118. When a coil module 102 is fastened to the magnetic return body 74, the coil axis 126 is oriented substantially parallel to the centre line 36 and to the axis 98 of the corresponding locating pin 96. In this case, it coincides in particular with the axis 98 of the locating pin 96.

Disposed on the base element 116 of the coil holder 114 is a flange 128 that extends down from the base element 116. The flange 128 in this case has a direction of extension that is parallel to the coil axis 126. (The flange 128 in this case may itself be aligned parallel to the coil axis 126 or be disposed for example obliquely relative to the coil axis 126.) The flange 128 therefore projects beyond a bottom boundary plane 130 that is defined by the base element 116.

Seated on the flange 128 are a first web 132 and a second web 134. The first web 132 and the second web 134 are oriented for example parallel to one another. The two webs 132 and 134 are oriented transversely of, and in particular at right angles to, the coil axis 126. The two webs 132 and 134 project beyond a boundary surface of the coil 86 on the coil module 102.

The first web 132 and the second web 134 are seated in this case on or in the vicinity of a bottom end of the flange 128.

The coil holder 114 with its base element 116 and its top element 118 is in particular of an integral construction. What is more, the flange 128 with the first web 132 and the second web 134 is disposed integrally on the coil holder 114. The coil holder 114 is manufactured in particular from a plastics material.

The first web 132 and the second web 134 are used to hold a first coil portion 136 and a second coil portion 138, wherein these two coil portions 136, 138 are oriented transversely and in particular at least approximately at right angles to the coil axis 126. The first coil portion 136 and the second coil portion 138 are moreover disposed at least approximately at the same height. They preferably have an envelope plane that is oriented parallel to the contact printed circuit board 82 when the coil module 102 is positioned on the magnetic return body 74.

The first coil portion 136 and the second coil portion 138 are oriented transversely of the first web 132 and the second web 134. For example, the first coil portion 136 is oriented substantially at right angles to the first web 132 and the second web 134. The second coil portion 138 lies, not parallel, but at an angle to the first coil portion 136 and hence also at a small acute angle (for example in the order of magnitude of 30°) to the first web 132 and the second web 134. It may additionally be provided that the first web 132 is designed shorter than the second web 134.

Figure 6:
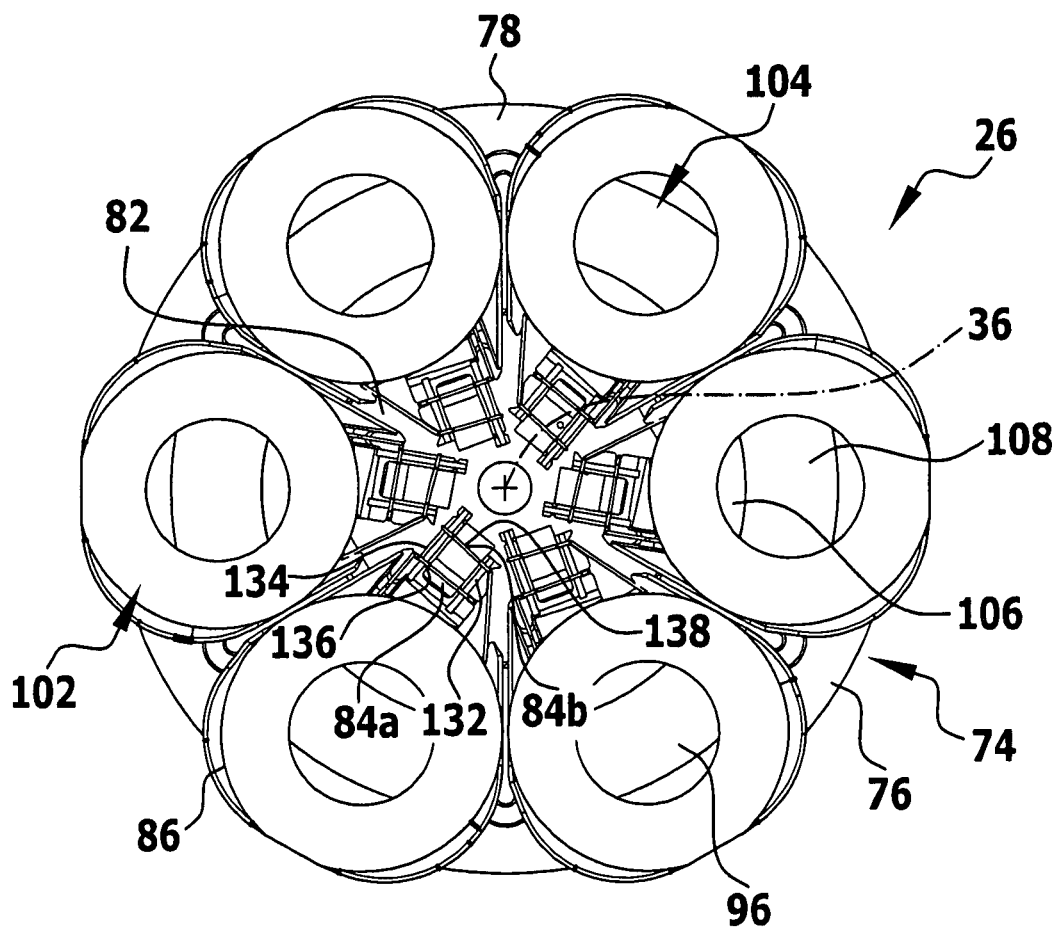
FIG. 6 shows a plan view of the (partial) stator according to FIG. 5 in direction A (from above)
Figure 7:
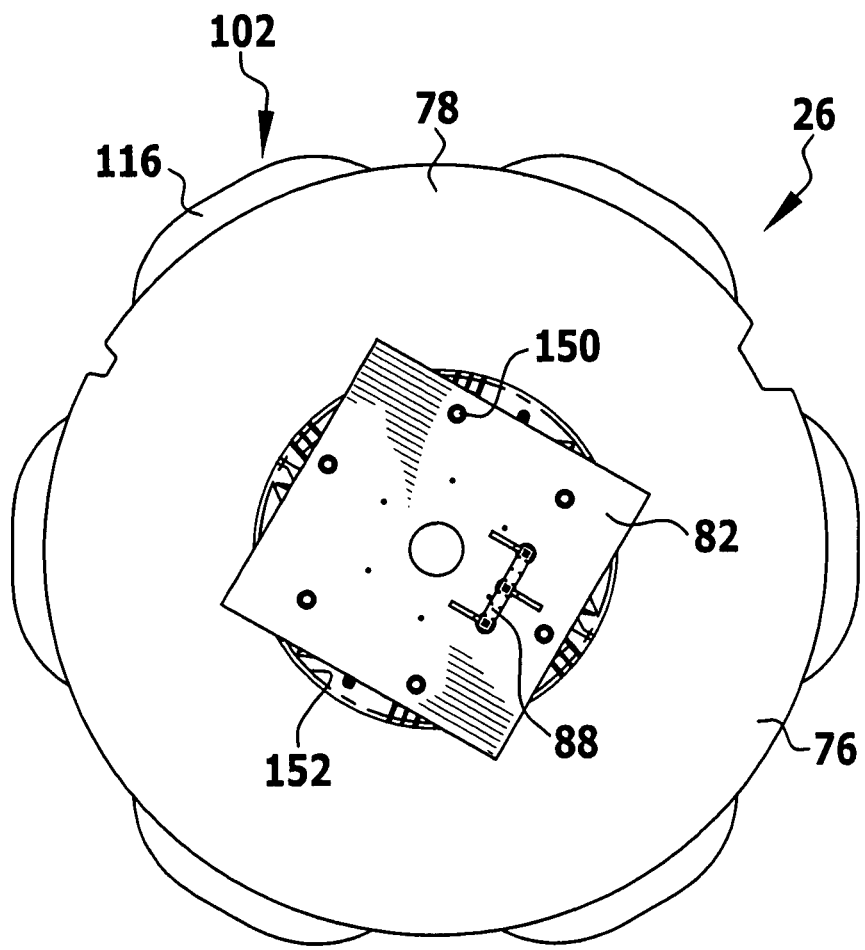
FIG. 7 shows a plan view of the (partial) stator according to FIG. 5 in direction B (from below)
Figure 8:
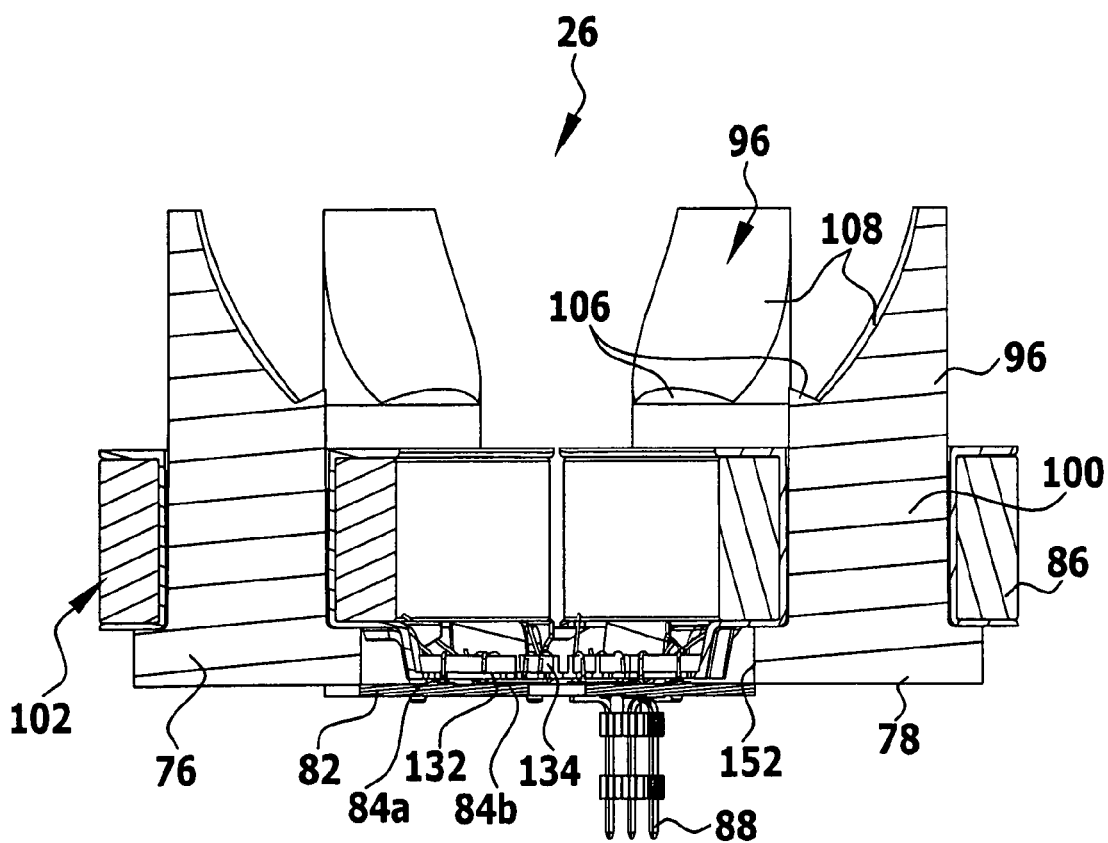
FIG. 8 shows a sectional view through the (partial) stator according to FIG. 5.

Given this construction, with the provision of a large contact surface it is possible to arrange a plurality of coil modules 102 distributed around the centre line 36 on the magnetic return body 74 (FIG. 6).

The first coil portion 136 lies in the vicinity of a first wire end 140 of the coil 86. The second coil portion 138 lies in the vicinity of a second wire end 142 of the coil 86.

The coil wire is fastened to the first web 132 and the second web 134 in each case by a winding 144a, 144b, 144c, 144d. Thus, the coil wire in the region of the first wire end 140 is fastened by the winding 144a to the first web 132. Emanating from this winding is the first coil portion 136, which extends between the first web 132 and the second web 134. By the winding 144b the coil wire is then further fastened to the second web 134. From there, the coil wire runs to the coil holder 114.

In the region of the second wire end 142 the coil wire is fastened by the winding 144d to the second web 134. From this winding 144d the second coil portion 138, which lies between the first web 132 and the second web 134, runs to the winding 144c, by which the coil wire is fastened to the first web 132. From this winding 144c the coil wire then runs to the coil holder 114.

The first web 132 and the second web 134 each have recesses 145 for receiving the corresponding windings 144a, 144b, 144c, 144d.

Associated with the coil module 102 is an anti-rotation device 146, by which the coil module 102 may be fastened in a rotationally fixed manner to the magnetic return body 74. The anti-rotation device 146 for this purpose comprises (at least) one pin 148, which is seated on the flange 128 and projects downwards substantially parallel to the coil axis 126.

The contact printed circuit board 82 has a pin receiver 150 (FIG. 7), which is associated with the corresponding coil module 102 and into which the pin 148 is introduced, given correct positioning of the coil module 102 on the associated locating pin 96.

The holding base 76 has a recess 152. If the holding base 76 takes the form of ring 78, then the recess 152 is the ring recess. The flange 128 of the respective coil modules 102 is introduced into this recess 152. The first web 132 and the second web 134 and hence also the first coil portion 136 and the second coil portion 138 of the corresponding coil module 102 are therefore positioned in the recess 152. In a downward direction towards the end wall 32 the recess 152 is delimited by the contact printed circuit board 82. The coil portions 136 and 138 lie adjacent, and are electrically connected, to the contact points 84a, 84b of the contact printed circuit board 82. The connection is established in particular by welding or soldering.

By the connection line or connection lines 88 in turn the electrical contact is established between the contact points 84a, 84b and the motor circuit 16.

To manufacture the stator 26, the magnetic return body 74 is manufactured in particular integrally from the compressed powder material.

Separately from this, the coil modules 102 are manufactured. In this case, in particular the coils 86 on the coil holders 114 are produced by winding by means of a winding machine.

The respective coil modules 102 are then mounted from above onto the locating pins 96 of the magnetic return body 74, and namely in such a way that the pins 148 of the coil modules 102 may engage into the pin receivers 150 of the contact printed circuit board 82 (which has previously been positioned on the magnetic return body 74). In this way, a correct alignment of the coil modules 102 is achieved.

The respective first coil portions 136 and second coil portions 138 are in this case, given appropriate dimensioning, positioned at the respective contact points 84a, 84b. The electric connection may then be effected from above by welding using a welding robot or by soldering.

Manufacture of the stator 26 may therefore be carried out with a high degree of automation.

Figure 10:
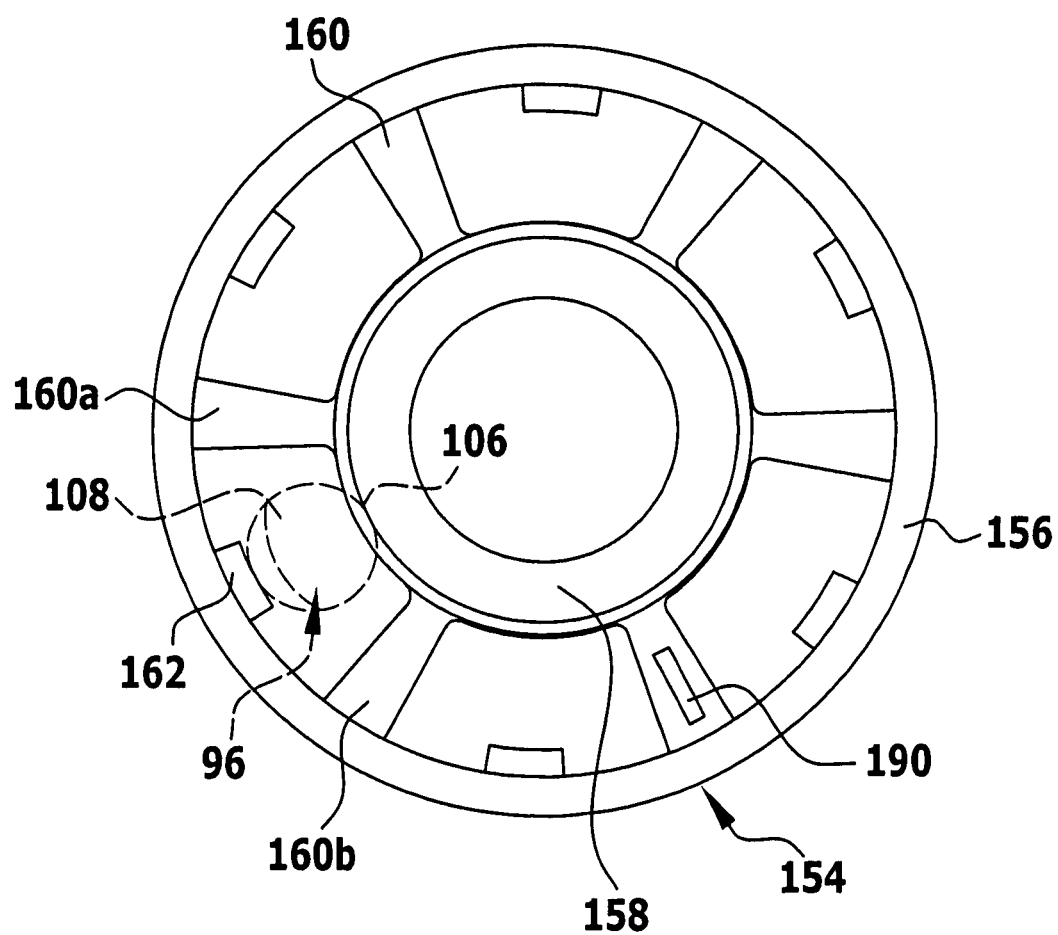
FIG. 10 shows a plan view of an embodiment of a top.

On the magnetic return body 74 having the coil modules 102 a top 154 is then mounted (FIG. 10), which is manufactured in particular from a plastics material.

The top 154 is for example of an integral construction. It comprises an annular element 156, which is positionable on the magnetic return body 74. It is mountable in particular onto the cover elements 108 of the coil modules 102. The annular element 156 is then positioned in the interior 22 of the first chamber 18.

Disposed inside the annular element 156 is an inner element 158. The inner element may be laid by corresponding lay-on surfaces onto the bottom surface regions 106 of the locating pins 96. By means of the inner element 158 the interspace between the coil modules 102 around the centre line 36 is covered.

The inner element 158 is held on the annular element 156 by means of intermediate webs 160. The number of intermediate webs in this case corresponds to the number of coil modules 102. In the embodiment shown in FIG. 10, six intermediate webs 160 are provided in accordance with the six coil modules 102 provided. The intermediate webs 160 are uniformly spaced apart from one another, for example at an angular distance of 60°.

Between adjacent intermediate webs 160a, 160b positioning elements 162 are disposed in the annular element 156. These positioning elements 162 are used for abutment with the second regions 104 of the locating pins 96 at a side remote from the spherical surface region 108. They allow the top 105 to be centred on the magnetic return body 74.

Disposed between adjacent intermediate webs 160a, 160b there are in each case pole shoes 164 of the magnetic return device 73, which are manufactured from permeable material (FIG. 2). The number of locating pins 96 and the number of pole shoes 164 corresponds to the number of intermediate webs 160. The intermediate webs 160 serve as an abutment element for the pole shoes 164 and for the spatial separation of adjacent pole shoes 164.

The pole shoes 164 are manufactured for example from a compressed powder material, which in particular has iron grains that are electrically isolated from one another.

The pole shoes 164 have the shape of a segment of a spherical cup, i.e. they have opposing spherical surfaces. The stator 26 therefore has a spherical surface facing the rotor 28 in the region of the pole shoes 164.

The pole shoes 164 are in mechanical contact with the respective locating pins 96 in order to provide a permeable connection.

Disposed on the pole shoes 164 is a cover 166 (separating calotte), which separates the stator 26 in a fluid-proof manner from a wet chamber of the circulation pump 10. The cover defines an interface between the stator 26 and the rotor 28.

The coil modules 102 with the respective coils 86 are disposed in relation to the centre line 36 below the rotor 28 and below the top 154, i.e. an envelope of the cover elements 118 lies below the rotor 28 and below the pole shoes 164.

The cover 166 forms a space 168 in the circulation pump 10, in which space the rotor 28 is positioned. This space 168 has the shape of a segment of a sphere corresponding to a hemisphere with a pole cap cut off.

The rotor 28 is spherically supported by means of the bearing body 112. The bearing body 112 is of a convex construction with a spherical surface 170.

The bearing body 112 is disposed in a rotationally fixed manner on a column 172. This column 172 is fixed on an outward curvature 173 of the cover 166 and extends above the inner element 158 with a coaxial alignment relative to the centre line 36. The bearing body 112 is manufactured for example from a ceramic material.

The rotor 28 comprises a concave bearing shell 174, which is positioned on the bearing body 112. By virtue of the bearing shell 174 and the bearing body 112 a spherical bearing is provided.

The rotor 28 is of a spherical design facing the stator 26, wherein a corresponding sphere centre coincides at least approximately with the centre 110.

The rotor 28 is designed as a magnetic field-generating rotor. For this purpose, it comprises one or more permanent magnets 176.

Formed between the cover 166 and the rotor 28 is an "air" gap 178 that in sections has the shape of a spherical cup. Through this gap 178 conveyed liquid may flow to the bearing body 112 in order to provide liquid lubrication of the spherical bearing (formed by means of the bearing body 112 and the bearing shell 174).

The air gap 178 is additionally in fluid-effective connection with the interior 56 of the circulation pump 10, in which interior the impeller 52 is rotatable.

The impeller 52 in this case is connected in a rotationally fixed manner to the bearing shell 174 and disposed in particular above the bearing body 112.

The electric motor 14 is electronically commutated. For this purpose, it comprises a position measuring device, which is disposed for example on the carrier 30 and is part of the motor circuit 16. It may also be disposed directly opposite the rotor 28 (not shown in the drawings).

In the electric motor 14, at least one sensor 180 is associated with the position measuring device and used to determine the rotor position in order to be able to control the coils 86 of the stator 26 in a corresponding manner.

The sensor 180 is for example a Hall-effect sensor.

The sensor 180 is disposed remote from the rotor 28. In the embodiment shown in FIG. 2, it is disposed on an additional carrier 182 that is seated below the coils 86.

It is also possible for the sensor 180 to be disposed on the carrier 30 in the second chamber 20.

For signal-effective coupling of the sensor 180 and the rotor 28, (at least) one flux guiding element 184 is provided as a flux guiding device 185, by means of which a rotor signal is transmitted from the rotor 28 to the remotely disposed sensor 180; the flux guiding element 184 effects a magnetic flux transmission from an outer side of the stator 26 (that faces the rotor 28) to the sensor 180.

The flux guiding element 184 is manufactured from a paramagnetic material and in particular from soft iron.

It comprises a signal pick-up region 186, which has an end 188 facing the rotor 28. This end 188 is in this case of a spherical or cylindrical construction. It lies directly below the cover 166.

In particular, there is formed in an intermediate web 160 a for example slot-shaped recess 190 (FIG. 10), in which the signal pick-up region 186 is disposed.

Integrally connected to the signal pick-up region 186 is a conducting region 192, via which the flux signals may be supplied from the signal pick-up region 186 to the sensor 180.

The conducting region 192 bridges the gap between the signal pick-up region 186 and the sensor 180.

In the embodiment shown in FIG. 2, the conducting region 192 extends substantially parallel to the centre line 186 through the stator 26 to the sensor 180.

If the sensor 180 is constructed in the second chamber 20, then this conducting region 192 extends in a corresponding manner into the second chamber 20.

The flux guiding element 184 is designed in particular as a lamina having a first side and an opposite, second side, between which the flux guiding element 184 extends. The first side and the second side are in this case of a substantially planar design and lie parallel to one another. (In FIG. 2 the first side and the second side lie parallel to the drawing plane.)

The signal pick-up region 186 is preferably wider than the conducting region 192 in order to provide an optimized signal pick-up.

The flux guiding device 185 allows the sensor 180 to be positioned at a suitable point in the circulation pump 10; the sensor 180 need no longer be positioned in the direct vicinity of the rotor 28 in order to obtain an optimized signal pick-up, rather it may be positioned at the point that is suitable in particular for ease of manufacture.

In the circulation pump 10, one or more electronic power components 38 that produce a great deal of heat may be cooled by means of conveyed liquid through thermal contact with the stator 26 (provided through the connection opening 92).

A stator 26 is provided, which is easy to manufacture. By means of the coil modules 102 the coils 86 may be manufactured in an automated manner by means of a winding machine. The coil modules 102 in turn may be contacted with the motor circuit 16 via the contact printed circuit board 82 in an automated manner, in particular by welding or soldering.

The fact that a flux guiding device 185 is associated with the (at least) one sensor 180 of the position measuring device of the electronically commutated electric motor 14 allows the sensor 180 to be disposed at an optimized position in particular with regard to manufacture of the electric motor and/or the circulation pump 10, wherein during operation of the electric motor 14 good signal level is provided.

The motor circuit 16 comprises an evaluation device 202, by means of which the flow rate of conveyed liquid through the circulation pump 10 may be determined and hence also the flow rate through a pipe 204 (FIG. 11), through which the conveyed liquid is conveyed by means of the circulation pump 10.

The evaluation device 202 comprises (at least) one processor 206, which is a processor of the motor circuit. The evaluation device 202 further comprises a storage device 208. This is integrated for example into the processor 206. The storage device 208 may also have one or more memory chips. The processor 206 with the storage device 208 is disposed on the carrier 30.

Disposed on the housing 12 in the region of the second chamber 20 is (at least) one connection 210 that forms a signal output 212. The connection 210 is connected in a signal-effective manner to the evaluation device 202. The evaluation device 202, as will be explained in more detail below, supplies flow rate signals for the conveyed liquid that may be tapped at the signal output 12 by means of the connection 210.

The electric motor 14 is electronically commutated. It is operable for example with a constant motor power P or at a constant rotational speed n of the rotor 28 and hence of the impeller 52 for conveying the liquid. In the former case, the motor circuit 16 regulates the electric motor 14 to a constant motor power. The rotational speed n (and thus the rpm) of the rotor 28 is measured by means of the sensor 180. Thus, at any time the rotational speed n is known to the evaluation device 202.

Figure 12:
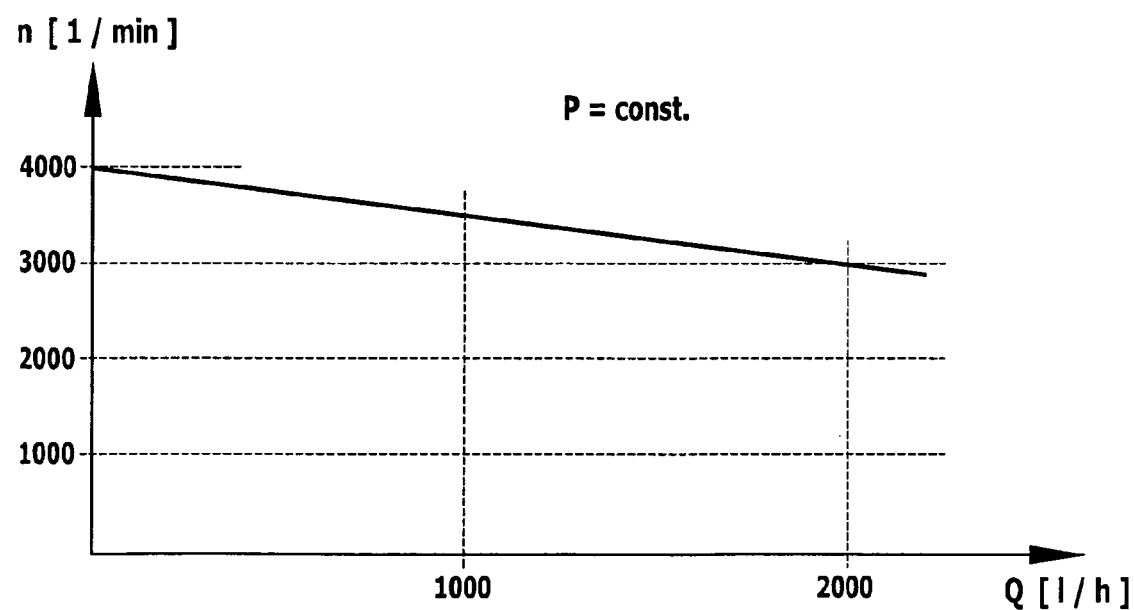
FIG. 12 shows diagrammatically the dependence of the rotational speed of a rotor upon the flow rate given a constant motor power.

In FIG. 12 the dependence of the rotational speed upon the flow rate of conveyed liquid through the circulation pump 10 given a constant motor power is diagrammatically shown. Given different values for the constant motor power, this dependence is a family of characteristics. The corresponding characteristic or the corresponding family of characteristics is stored in the storage device 208.

Thus, given for example a defined constant motor power, to which regulation is effected, the flow rate may be determined from the known rotational speed by the evaluation device 202 and tapped via the signal output 212.

In the case of this evaluation method, the circulation pump 10 is operated in an operating mode, in which regulation to a constant power occurs. The value of this regulated constant power depends upon the application. In the case of this operating mode, upon a reduction of the delivery rate the rotational speed n of the rotor 28 increases.

Figure 13:
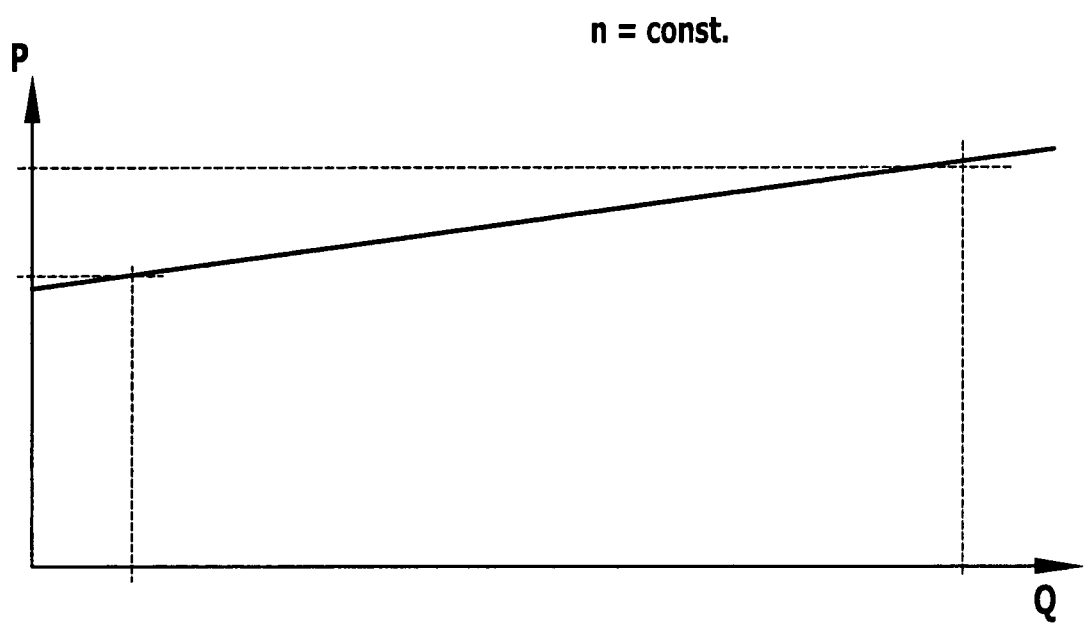
FIG. 13 shows diagrammatically the dependence of the flow rate upon the motor power of an electric motor given a constant rotational speed of a rotor of the electric motor.

It is also possible for the electric motor 14 to be operated in an operating mode, in which regulation to a constant rotational speed n occurs. For this situation, the motor power P in its dependence upon the flow rate Q is shown diagrammatically in FIG. 13. For different values of the rotational speeds a family of characteristics arises. This family of characteristics and/or the corresponding characteristic is alternatively or additionally stored in the storage device 208. The motor power P may be determined by means of the motor circuit 16. Thus, the evaluation device 202 using data of the motor circuit 16 may determine the flow rate Q also in the operating mode with a constant rotational speed and supply the flow rate via the signal output 212.

It is in principle also possible to use a mathematical relationship in the evaluation device in order to calculate the flow rate Q from the rotational speed n and the motor power P. This mathematical relationship is stored as an algorithm in the evaluation device 202. For example, in the case of an unregulated circulation pump, in which the rotational speed n and/or the motor power P are fixed, an at least approximately linear relationship arises.

In the case of an electronically commutated electric motor 14, a correlation exists between the electric power consumption and the hydraulic power. Thus, from motor data the flow rate may be determined by means of the evaluation device 202, which is integrated into the circulation pump 10, without having to provide an external sensor for determining the flow rate. The circulation pump 10 may supply via the signal output 212 at the connection 210 a flow rate signal that has been determined internally by the circulation pump 10.

The circulation pump 10 therefore has a supplementary function, namely supplying a flow rate signal, which is easy to supply by effecting an evaluation of already existing data by means of the evaluation device 212.

It is alternatively or additionally possible for the circulation pump 10 to supply a flow rate-dependent switching signal. The evaluation device 202 for this purpose determines the flow rate and then generates an "on"/"off" switching signal in dependence upon the determined flow rate.

In principle, the electrical resistance of the coils 86 of the stator 26 is temperature-dependent. The temperature-dependent resistance influences the data needed to determine the flow rate Q. To increase the accuracy of the flow determination at least one temperature sensor 214 is associated with the stator 26. This determines the temperature at one or more of the coils 86. The temperature sensor 214 is connected in a signal-effective manner to the evaluation device 202 and supplies it with the temperature values. As a result, the temperature-dependent resistance of winding of the coils 86 may be taken into account and hence have some influence on the determination of Q. The measured temperature value is used in particular to select the relevant characteristic or the relevant family of characteristics. A program unit of the evaluation device 202 takes the temperature dependence of the windings of the coils 86 and the corresponding influence into account when determining Q.

It is moreover in principle possible for the bearing friction at the bearing body 112 to influence the determination of the flow rate Q. The power consumption of the electric motor 14 is correlated with the cube of the rotational speed, while the bearing friction shows a linear relationship to the rotational speed. The bearing friction component may therefore be determined by for example reducing the rotational speed n. The evaluation device 202 may comprise a program unit for at least approximately determining the bearing friction component for example by lengthening the rotational speed. The bearing friction component may then be taken into account by the evaluation device 202 when determining Q from the corresponding family of characteristics.

Figure 11:
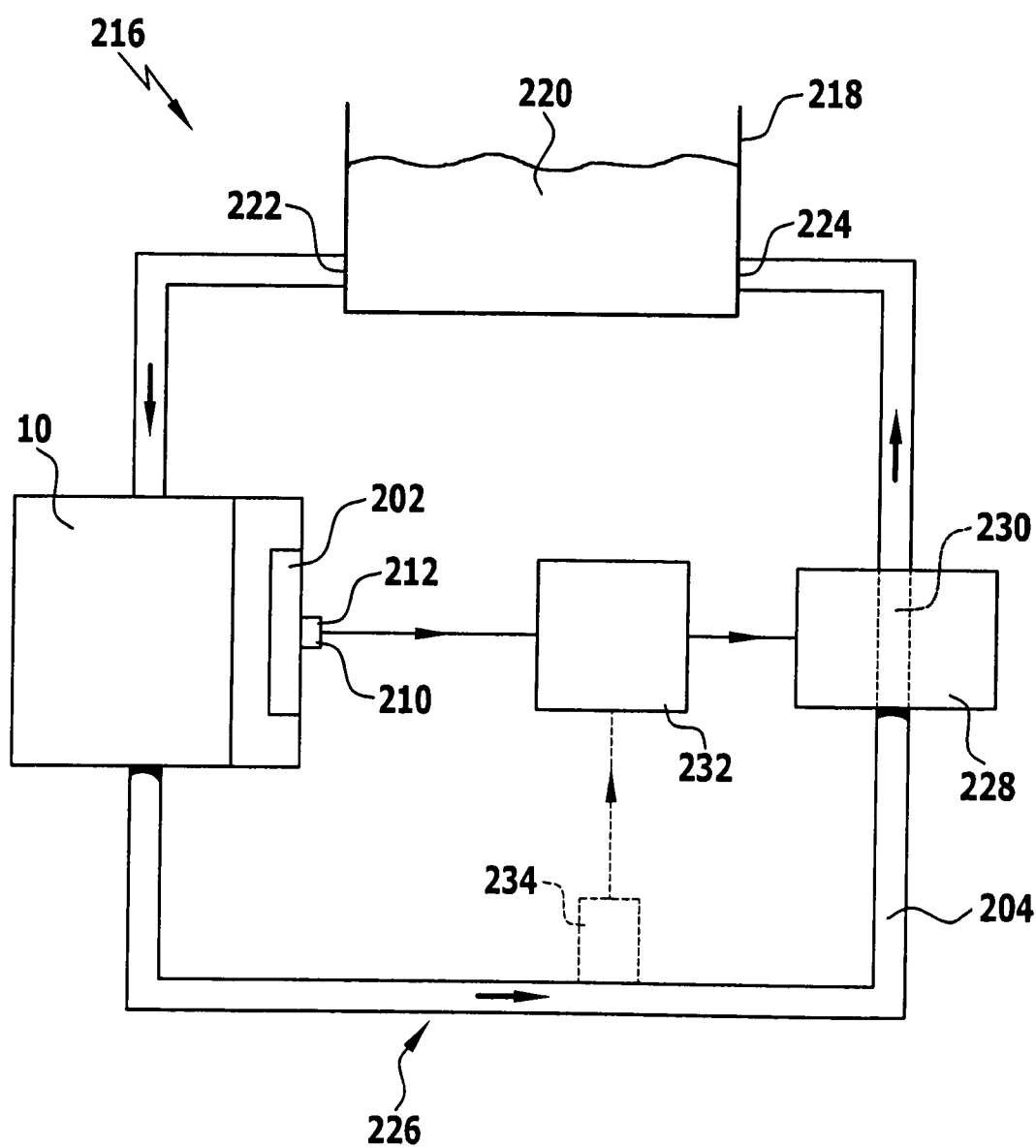
FIG. 11 shows diagrammatically an embodiment of a heating system having a heater and a circulation pump.

The circulation pump 10 is integrated for example into a heating system 216, which is diagrammatically shown in FIG. 11. The heating system 216 comprises a basin 218 with a liquid receiving space 220. The liquid receiving space 220 has a first port 222, through which liquid is removable from the liquid receiving space 220. It further has a second port 224, into which liquid is introducible. The pipe 204 is connected to the ports 222 and 224.

Seated on the pipe 204 is the circulation pump 10. This is used to convey conveyed liquid (in particular water) in a circuit 226. In the circuit 226 a heater 228 is disposed. This heater 228 is disposed in particular at a flow-through region 230. It heats liquid as it flows past. By means of the liquid flowing past, the heater 228 itself is cooled.

Corresponding heaters are described in DE 103 04 398 A1, DE 103 22 366 A1, US 2005/0141888 A1 and US 2005/0141889 A1, to which express reference is made.

The heater 228 is disposed outside the liquid receiving space 222. The heating of liquid is effected outside the basin 218. The basin 218 is for example the basin of a bathtub or of a spa.

Associated with the heater 228 is a control device 232. This controls the heater 228. In particular, it is used to switch the heater 228 off if irregularities are detected.

From the background art it is known for there to be disposed on the pipe 204 a sensor and/or switch 234, which supplies the control device 232 with information about the flow rate through the pipe 204. Such a switch and/or sensor for example takes the form of a paddle switch with reed relay or a banking-up pressure switch, which however measures, not the throughput, but only the banking-up pressure.

According to the invention it is provided that the circulation pump 10 supplies its flow rate signal, which lies across the signal output 212, to the control device 232, i.e. the signal output 212 is connected in a signal-effective manner to the control device 232. The switch and/or sensor 234 is therefore no longer necessary.

The circulation pump 10 supplies the control device 232 with the corresponding flow rate signal that characterizes the flow rate through the flow-through region 230.

It is therefore easy for example to detect an obstruction in the region of the first port 222 or second port 224. In such a situation the throughput at the flow-through region 230 is reduced. This may lead to the liquid in the flow-through region 230 being heated up too much and/or the heater 228 being no longer adequately cooled. An emergency shutdown is then required.

By means of the flow rate signal supplied by the circulation pump 10 the open-loop/closed-loop control device 232 may, if too low a throughput is detected, carry out such an emergency shutdown of the heater 228.

For example, it is possible also to fix an upper limit for the flow rate, above which an emergency shutdown is carried out. If for example a pipe 204 is fractured, too high a throughput may occur. If too high a throughput is detected, then, after being supplied with the corresponding signal by the circulation pump 10, the control device 232 may likewise bring about an emergency shutdown of the heater 228 and optionally also of the circulation pump 10.

The circulation pump 10 may also supply a flow rate-dependent switching signal. This may then be supplied without further processing directly or via the control device 232 to the heater 228. The heater 228 is operated by means of this flow rate-dependent switching signal. In this case, a suitable hysteresis may then be defined in the evaluation device 202, i.e. it is defined at which flow rate and/or in which flow rate range the switching signal is switched to "on" and at which flow rate and/or in which flow rate range the switching signal is set to "off". Given suitable definition of the hysteresis, it is therefore possible to avoid frequent switching of the heater 228 in a limit range. Fluttering is prevented.

In the solution in accordance with the invention, a "flow rate sensor" or "flow rate switch" is integrated into the circulation pump 10. The flow rate in this case is determined from a family of characteristics, wherein the entered data (rotational speed given a constant motor power and/or motor power given a constant rotational speed) are known as such through operation of the electric motor 14 by the motor circuit 16. As a result of the electronically commutated electric motor 14 there is a correlation between the electric power consumption and the hydraulic power; this correlation is utilized to determine the flow rate Q.

The invention claimed is:

1. Circulation pump for a conveyed liquid, comprising:
   an electric motor, which is electronically commutated and has a rotor, a stator and a motor circuit; and
   an impeller that is connected in a rotationally fixed manner to the rotor;
   the motor circuit comprising an evaluation device, by means of which a flow rate of conveyed liquid through the circulation pump is determinable from at least one of a rotational speed of the rotor and a power consumption of the electric motor, and
   at least one external signal output, by which at least one of a flow rate signal and flow rate-dependent switching signal is suppliable out of the circulation pump,
   wherein:
   the motor circuit comprises means for providing an operating mode with at least one of control to a constant motor power and control to a constant rotational speed,
   in the operating mode with the control to a constant motor power, the evaluating device is adapted to determine the flow rate with given defined motor power from the rotational speed, and
   in the operating mode with the control to a constant rotational speed, the evaluating device is adapted to determine the flow rate with given rotational speed from power consumption data provided by the motor circuit.

2. Circulation pump according to claim 1, wherein the evaluation device is at least partially integrated into the motor circuit.

3. Circulation pump according to claim 1, wherein the evaluation device comprises at least one processor, which is a processor of the motor circuit.

4. Circulation pump according to claim 1, wherein the evaluation device comprises a storage device.

5. Circulation pump according to claim 4, wherein in the storage device at least one of a characteristic, a family of characteristics, and an algorithm relating to a dependence of the flow rate upon the rotational speed of the rotor given a constant motor power and/or a dependence of the flow rate upon the motor power given a constant rotational speed of the rotor are stored.

6. Circulation pump according to claim 1, wherein the constant motor power is adjustable.

7. Circulation pump according to claim 1, wherein the constant rotational speed is adjustable.

8. Circulation pump according to claim 1, wherein an operating mode is provided in which the evaluation device supplies the flow rate-dependent switching signal with an adjusted or adjustable hysteresis.

9. Circulation pump according to claim 1, wherein the motor circuit is disposed in a second chamber of a housing, which second chamber is separate from a first chamber of the housing, in which first chamber the stator and the rotor are disposed.

10. Circulation pump according to claim 9, wherein the evaluation device is disposed in the second chamber.

11. Circulation pump according to claim 1, wherein the rotor is of a spherical design facing the stator.

12. Circulation pump according to claim 1, wherein the rotor is spherically mounted.

13. Circulation pump according to claim 1, wherein there is associated with the stator an interface that faces the rotor and is of spherical design.

14. Circulation pump according to claim 1, wherein the rotor by means of one or more permanent magnets is a magnetic-field-generating rotor.

15. Circulation pump according to claim 1, wherein coils of the stator are disposed below the rotor.

16. Circulation pump according to claim 1, further comprising at least one temperature sensor associated with the stator for measuring a temperature at at least one coil of the stator.

17. Circulation pump according to claim 16, wherein the at least one temperature sensor is connected in a signal-effective manner to the evaluation device.

18. Circulation pump according to claim 17, wherein the evaluation device comprises a program unit that takes a resistance of stator coils into account when determining the flow rate.

19. Circulation pump according to claim 1, wherein the evaluation device comprises a program unit that takes a bearing friction during rotation of the rotor into account when determining the flow rate.

20. Heating system for heating a liquid in a basin, comprising:
a flow-through region for liquid that is positioned outside a liquid receiving space of the basin;
a heater that is disposed at the flow-through region;
a control device for the heater; and
a circulation pump for conveying the liquid through the flow-through region, wherein at least one signal output of the circulation pump is connected in a signal-effective manner to the control device;
said circulation pump comprising:
an electric motor, which is electronically commutated and has a rotor, a stator and a motor circuit; and
an impeller that is connected in a rotationally fixed manner to the rotor;
the motor circuit comprising an evaluation device, by means of which a flow rate of conveyed liquid through the circulation pump is determinable from at least one of a rotational speed of the rotor and a power consumption of the electric motor, and
at least one external signal output, by which at least one of a flow rate signal and flow rate-dependent switching signal is suppliable out of the circulation pump,
wherein:
the motor circuit comprises means for providing an operating mode with at least one of control to a constant motor power and control to a constant rotational speed,
in the operating mode with the control to a constant motor power, the evaluating device is adapted to determine the flow rate with given defined motor power from the rotational speed, and
in the operating mode with the control to a constant rotational speed, the evaluating device is adapted to determine the flow rate with given rotational speed from power consumption data provided by the motor circuit.

21. Method of determining the flow rate of a liquid through a pipe, comprising:
conveying the liquid by means of a circulation pump, which has an electronically commutated electric motor;
determining the flow rate by means of an evaluation device, which is integrated into the circulation pump, from at least one of the rotational speed of a rotor of the electric motor and a power consumption of the electric motor; and
supplying, via an external signal output, at least one of a flow rate signal and flow rate-dependent switching signal out of the circulation pump,
wherein:
a motor circuit of the electric motor comprises means for providing an operating mode with at least one of control to a constant motor power and control to a constant rotational speed,
in the operating mode with the control to a constant motor power, the evaluating device is adapted to determine the flow rate with given defined motor power from the rotational speed, and
in the operating mode with the control to a constant rotational speed, the evaluating device is adapted to determine the flow rate with given rotational speed from power consumption data provided by a motor circuit of the electric motor.

22. Method according to claim 21, wherein the evaluation device determines the flow rate from at least one of a stored characteristic, a stored family of characteristics, and an algorithm.

23. Method according to claim 21, wherein the circulation pump during operation is controlled to a constant motor power or to a constant rotational speed.

24. Method according to claim 21, wherein at least one of the flow rate signal and switching signal is supplied to a control device of a heater, which is disposed on the pipe.

25. Method according to claim 21, wherein the circulation pump supplies the flow rate-dependent switching signal with a predetermined hysteresis.

* * * * *